(12) United States Patent
Castellanos Zamora et al.

(10) Patent No.: US 10,652,942 B2
(45) Date of Patent: May 12, 2020

(54) METHOD AND DEVICE FOR NETWORK INITIATED PACKET DATA UNIT, PDU, SESSION ESTABLISHMENT IN A TELECOMMUNICATION NETWORK

(71) Applicant: Telefonaktiebolaget LM Ericsson (publ), Stockholm (SE)

(72) Inventors: David Castellanos Zamora, Madrid (ES); Peter Hedman, Helsingborg (SE); Ralf Keller, Würselen (DE); Angel Navas Cornejo, Leganes (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 169 days.

(21) Appl. No.: 15/760,026

(22) PCT Filed: Feb. 23, 2018

(86) PCT No.: PCT/EP2018/054552
§ 371 (c)(1),
(2) Date: Mar. 14, 2018

(87) PCT Pub. No.: WO2019/034291
PCT Pub. Date: Feb. 21, 2019

(65) Prior Publication Data
US 2019/0053308 A1 Feb. 14, 2019

Related U.S. Application Data

(60) Provisional application No. 62/545,069, filed on Aug. 14, 2017.

(30) Foreign Application Priority Data

Oct. 2, 2017 (EP) .................................... 17380021

(51) Int. Cl.
*H04W 76/15* (2018.01)
*H04W 60/00* (2009.01)
(Continued)

(52) U.S. Cl.
CPC ......... *H04W 76/15* (2018.02); *H04L 65/1016* (2013.01); *H04L 65/1073* (2013.01);
(Continued)

(58) Field of Classification Search
None
See application file for complete search history.

(56) References Cited

U.S. PATENT DOCUMENTS

2018/0262924 A1* 9/2018 Dao ...................... H04W 24/02
2018/0324577 A1* 11/2018 Faccin .................... H04W 8/06
(Continued)

OTHER PUBLICATIONS

3rd Generation Partnership Project, "Technical Specification Group Services and System Aspects; General Packet Radio Service (GPRS) enhancements for Evolved Universal Terrestrial Radio Access Network (E-UTRAN) access (Release 14)", 3GPP TS 23.401 V14.2.0, Dec. 2016, pp. 1-385.
(Continued)

*Primary Examiner* — Donald L Mills
(74) *Attorney, Agent, or Firm* — Coats + Bennet, PLLC

(57) ABSTRACT

A method of establishing a Packet Data Unit, PDU, session between a User Equipment, UE (51; 600), and a data network identified by a Data Network Name, DNN, in a telecommunication network. The telecommunication network comprising an Access and Mobility Function, AMF (56; 66; 500), and a Policy Control Function, PCF (60; 700). The method comprising the steps of receiving (3; 310), by the AMF (56; 66; 500), a registration request initiated by a UE (51; 600) for registering the UE (51; 600) in the telecommunication network; retrieving (16; 320), by the
(Continued)

AMF (56; 66; 500), from the PCF (60; 700), PDU session establishment information, wherein the step of retrieving (16; 320) is triggered upon receiving (3; 310) the registration request; receiving (16*b*, 330), by the AMF (56; 66; 500), from the PCF (60; 700), PDU session establishment information comprising one or more DNNs to which PDU sessions are to be established by the UE (51; 600), and transmitting (21*a*; 340), by the AMF (56; 66; 500), to the UE (51; 600) an instruction comprising one or more DNNs for establishing at least one PDU session between the UE (51; 600) and at least one DNN of the one or more DNNs upon receipt of the instruction. Complementary methods and equipment arranged to perform such a method are also presented.

18 Claims, 7 Drawing Sheets

(51) Int. Cl.
*H04L 29/06* (2006.01)
*H04W 60/04* (2009.01)
*H04W 76/12* (2018.01)
*H04W 36/00* (2009.01)

(52) U.S. Cl.
CPC ........... *H04W 60/00* (2013.01); *H04W 60/04* (2013.01); *H04W 76/12* (2018.02); *H04W 36/00835* (2018.08)

(56) References Cited

U.S. PATENT DOCUMENTS

2018/0324646 A1* 11/2018 Lee .................. H04W 36/0016
2019/0007500 A1* 1/2019 Kim ..................... H04L 67/141
2019/0053104 A1* 2/2019 Qiao ..................... H04W 28/24

OTHER PUBLICATIONS

3rd Generation Partnership Project, "Technical Specification Group Services and System Aspects; System Architecture for the 5G System; Stage 2 (Release 15)", 3GPP TS 23.501 V1.0.0, Jun. 2017, pp. 1-146.

3rd Generation Partnership Project, Technical Specification Group Services and System Aspects; Procedures for the 5G System; Stage 2 (Release 15), 3GPP TS 23.502 V0.4.0, May 2017, pp. 1-126.

3rd Generation Partnership Project, "3rd Generation Partnership Project; Technical Specification Group Core Network and Terminals; Study on CT WG3 Aspects of 5G System—Phase 1; Stage 3 (Release 15)", Technical Report, 3GPP TR 29.890 V0.2.0, May 1, 2017, pp. 1-42, 3GPP.

Ericsson, "23.502: Event triggers handling in Policy Framework", SA WG2 Meeting #123, Ljubljana, Slovenia, Oct. 23, 2017, pp. 1-14, S2-176908, 3GPP.

3rd Generation Partnership Project, "3rd Generation Partnership Project; Technical Specification Group Services and System Aspects; Procedures for the 5G System; Stage 2 (Release 15)", Technical Specification, 3GPP TS 23.502 V0.5.0, Jul. 1, 2017, pp. 1-153, 3GPP.

* cited by examiner

METHOD AND DEVICE FOR NETWORK INITIATED PACKET DATA UNIT, PDU, SESSION ESTABLISHMENT IN A TELECOMMUNICATION NETWORK

TECHNICAL FIELD

The present disclosure generally relates to Packet Data Unit, PDU, session establishment between a User Equipment, UE, and a data network identified by a Data Network Name, DNN, in a telecommunication network and, more specifically, to a network initiated PDU session establishment at registration of the UE in a Fifth Generation Core Network, 5GC, telecommunications system.

BACKGROUND

In Fourth Generation, 4G, Evolved Packet Core, EPC, systems, User Equipment, UE, may attach to the 4G/EPC system to gain connectivity towards Packet Data Networks, PDNs. A PDN connection is defined as the association between a UE, represented, for example, by an Internet Protocol, IP, address, and a Packet Data Network, PDN, represented by an Access Point Name, APN.

An APN is a label according to Domain Name System, DNS, naming conventions, describing the access point to the packet data network. The list of authorized/subscribed APNs for a given UE together with the characteristics of the PDN connections for each APN, such as IP vs non-IP type, default Quality of Service, QoS, etc., is stored in a Home Subscriber Server, HSS, of the telecommunication system as part of the subscription information for each UE or subscriber.

The subscription profile information may contain at least the configuration for a default APN. There may be at most two default APNs for a given UE, such as one default APN for PDNs of an "IF" type and another default APN that may belong to PDNs of a "Non-IP" type.

Up to 3rd Generation Partnership Project, 3GPP, Release 15, 3GPP Rel-15, for delivering a first set of 5G standards, during an Attach procedure, the UE shall include a PDN connectivity request procedure, and the EPC Core Network shall establish a PDN connection for the default APN when no APN is provided by the UE. A UE connected in Long Term Evolution, LTE, /EPC shall have at least one active PDN connection, otherwise the LTE/EPC will detach the UE from the system.

A Voice over LTE, VoLTE, UE, based on IR.92 IP Multimedia Subsystem, IMS, Profile for Voice and Short Message Service, SMS, supports the use of an APN during the Attach procedure and also to rely on the default APN for the first PDN connection that has to be established.

In 3GPP Rel-15, a feature allowing "Attach without PDN Connectivity" has been introduced, where a UE may be connected to the LTE/EPC system without any active PDN connection. This feature is controlled by an additional "PDN-Connection-Restricted" flag. This flag, when set, and if the Mobility Management Entity, MME, and the UE support Attach without PDN connection, indicates the MME that same shall not establish any non-emergency PDN connection for the user.

The possibility for a UE to attach to a 5G telecommunication network without an active PDN connection, has been made the baseline mode of operation in 5G, except for the fact that the concepts of PDN Connection and APN have been renamed to Packet Data Unit, PDU, Session and Data Network Name, DNN, respectively.

Furthermore, according to current versions of the technical specifications 3GPP TS 23.501 and 23.502, PDU sessions can only be established upon UE request. At most, upon request from an Application Server, AS, 5GC is able to trigger a specific application in the UE. The UE, when receiving such trigger message, shall pass same to the identified application in the UE, where the identified application in the UE may establish a PDU Session to a specific DNN.

Currently there is no mechanism defined in 3GPP for 5GC itself to trigger the UE to establish a PDU session in 5GC. In other words, it is currently not possible to have the same behavior with 5GC as with EPC in relation to the handling of default APN/DNN. In case the user subscription marks the IMS APN/DNN as default APN, 5GC will not trigger the establishment of the DNN during registration in 5GC.

The existing mechanisms for PDU session establishment are either UE initiated or network, NW, initiated after invocation of an Application Server external to the 5GC network, and even in this NW initiated method the actual PDU session is established by the UE.

The currently defined network initiated PDU session establishment procedure by 3GPP is suitable as a device trigger mechanism for Internet of Things, IoT, devices and for which this mechanism requests the UE to establish PDU sessions triggered by an IoT application platform. This device trigger request is completed by sending an SMS to the UE including the information required for the UE, i.e. the 5GC, to support SMS.

However, for certain services, such as but not limited to, IP Multimedia Subsystem, IMS, voice services, the network initiated PDU session establishment procedure presently defined in 3GPP is not suitable. These devices are expected to be connected running the PDU session towards the IMS at all times. In the absence of support for a network initiated PDU session establishment procedure in 5GC, the PDU session establishment process is delegated to the UE. An appropriate UE configuration is therefore advantageous for proper service delivery and user experience.

SUMMARY

There is provided a method of establishing a Packet Data Unit, PDU, session between a User Equipment, UE, and a data network identified by a Data Network Name, DNN, in a telecommunication network, the telecommunication network comprising an Access and Mobility Function, AMF, and a Policy Control Function, PCF.

In a first aspect of the present disclosure, the method, when performed in an AMF of the telecommunication network, comprises the steps of: receiving, by the AMF, of a registration request initiated by a UE for registering the UE in the telecommunication network; retrieving, by the AMF, from the PCF, PDU session establishment information, wherein the step of retrieving is triggered upon receiving the registration request; receiving, by the AMF, from the PCF, PDU session establishment information comprising one or more DNNs to which PDU sessions are to be established by the UE, and transmitting, by the AMF to the UE an instruction comprising one or more DNNs for establishing at least one PDU session between the UE and at least one DNN of the one or more DNNs upon receipt of the instruction.

According to the presented method, the telecommunication network initiates the PDU session establishment. That is, the telecommunication network, i.e. the AMF, provides information to the UE, triggered by the registration procedure of the UE, about the PDU session that the telecommunication network expects the UE to establish upon completion of the registration procedure. The AMF may instruct the UE to establish an PDU session directly or immediately after registration of the UE in the telecommunication network, for example.

One of the advantages of this solution is that the telecommunication network does not need to rely on a proper UE configuration. The telecommunication network controls which PDU sessions are to be established, and which DNNs are to be used for the PDU sessions.

The method is advantageous for Mobile Network Operator, MNO, services such as IP Multimedia Subsystem, IMS, voice service, where the establishment of the corresponding PDU session can be instructed to the UE based on, for example, subscription information in the Unified Data Management, UDM, function. In such a case, the telecommunication network may assure that a PDU session which may be required for these type of services is available for the UE upon registration in the network or telecommunications system, such as a Fifth Generation Core Network, 5GC, telecommunications system.

According to an embodiment of the present disclosure, the PDU session establishment information received by the AMF, from the PCF, is comprised in UE policy data or UE policies. Providing UE policies to the AMF by the PCF is an already established procedure that, advantageously, may be enhanced by transmitting the PDU session establishment information to the AMF, in accordance with the present disclosure.

In a further embodiment, wherein the UE policy data received by the AMF from the PDU comprise UE Route Selection Policies, URSP, data, the one or more DNNs for establishing a PDU session by the UE are comprised by the URSP data.

The UE policy data may comprise PDU session type information specifying a type of PDU session, such as an IMS voice session to be established with a respective DNN of the one or more DNNs according to the present disclosure.

In an embodiment of the present disclosure, the instruction transmitted by the AMF to the UE may comprise the UE policy data received by the AMF. As policy rules may be updated by an MNO, for example, when receiving, by the AMF, from the PCF, an updated set of policy rules pertaining to the UE including one or more DNNs to which PDU sessions are to be established, in accordance with the present disclosure, the updated set of policy rules is forwarded, by the AMF, to the UE.

In a second aspect of the present disclosure, the method, when performed in a UE of the telecommunication network, comprises the steps of: initiating, by the UE, a registration request for registering the UE in the telecommunication network; receiving, by the UE, from an AMF of the telecommunication network, in response to the registration request, an instruction comprising one or more DNNs for establishing at least one PDU session between the UE and at least one DNN of the one or more DNNs, and establishing, by the UE, at least one PDU session with at least one DNN of the one or more DNNs upon receiving the instruction.

As the UE receives the information for establishing at least one PDU session from the AMF upon registration with the telecommunication network, additional procedures and signalling in the UE for retrieving and updating DNNs and PDU session related information are effectively avoided. For example, the telecommunication network does not need to rely on a proper UE configuration as the telecommunication network controls which PDU sessions are to be established, and which DNNs are to be used for these PDU sessions.

The DNNs may be provided to the UE in a registration complete message, for example. The registration complete message as such is a known message in the registration procedure of a UE with the telecommunication network, such as 5GC, indicating to the UE that the UE has been successfully registered in the telecommunication network. That particular message may be extended, in accordance with the present disclosure, with a new information element used for conveying a list of DNNs to which the UE should set up PDU sessions, for example.

In an embodiment of the second aspect of the present disclosure, the instruction received by the UE, from the AMF, comprises UE policy data, and the at least one PDU session is established by the UE in accordance with these UE policy data. For example, an IMS voice capable UE may be instructed to establish the PDU session related to the IMS DNN as soon as being registered in the telecommunication network, such as a 5GC network of a telecommunications system.

According to another embodiment of the second aspect of the present disclosure, when setting up a plurality of sessions to different DNNs, the UE establishes such different PDU sessions each with a different DNN of the one or more DNNs in a sequential manner.

Prior to the step of establishing at least one PDU session by the UE, same may first check whether any PDU sessions are to be established towards a Data Network identified by the one or more received DNNs. Thus, either the instruction itself may provide information for when to establish a PDU session, or the UE determines whether to start setting-up a PDU session by interpreting the received instruction. Thus, the AMF provides either just the type of the instruction and/or the content of the instruction to the UE, including how to handle the instruction by the UE.

In a third aspect of the present disclosure, the method, when performed in a PCF of the telecommunication network, comprises the steps of: receiving, by the PCF, a request from an AMF for PDU session establishment information for the UE, and transmitting, by the PCF, to the AMF, PDU session establishment information comprising one or more DNNs for establishing at least one PDU session between the UE and at least one DNN of the one or more DNNs.

In an embodiment according to third aspect of the disclosure, the PCF transmits the PDU session establishment information in UE policy data.

In a further embodiment of the method according to the third aspect of the present disclosure, the PCF subscribes to UE policy data related events available in the network; updates UE policy data based on the UE policy data related events, and transmits the PDU session establishment information in the updated UE policy data.

In this manner, it is guaranteed that the UE receives updated information for establishing at least one PDU session upon registration with the telecommunication network, not requiring additional procedures and signalling in the UE for updating DNNs and PDU session related information. Further, a telecommunication operator does not need to rely on proper UE updates.

According to an embodiment of the method of the third aspect of the present disclosure, wherein the updated UE policy data comprise UE Route Selection Policy, URSP, data and DNN selection policy data, the URSP data comprise: Session and Service Continuity, SSC, Mode Selection Policy, MSP, data and Network Slice Selection Policy, NSSP, data, wherein both SSCMSP data and NSSP data determine an SSC mode and a slice selected for a PDU session to be established by the UE. The DNN selection policy data arranged for at least one of: determining a PDU session to be utilized by the UE; determining when a new PDU session should be established to a new DNN, and indicating an access type on which a PDU session to a certain DNN is to be requested.

In a fourth aspect of the present disclosure, there is presented an Access and Mobility Function, AMF, or AMF node, arranged for initiating a Packet Data Unit, PDU, session between a registering User Equipment, UE, and a data network identified by a Data Network Name, DNN, in a telecommunication network, the AMF comprising:
- a receive module, arranged for receiving a registration request initiated by the UE for registering the UE in the telecommunication network;
- a retrieve module, arranged for retrieving from a Policy Control Function, PCF, in the telecommunication network, PDU Session establishment information, wherein the retrieve module is activated upon receiving the registration request by the receive module, the receive module being further arranged to receive, from the PCF, PDU session establishment information comprising a listing of one or more DNNs to which PDU sessions are to established by the UE, and
- an instruct module, arranged for instructing the UE to establish at least one PDU session between the UE and at least one DNN of the listing of one or more DNNs.

In a fifth aspect of the present disclosure, there is presented a User Equipment, UE, arranged for establishing a Packet Data Unit, PDU, session in a telecommunication network between the UE and a data network identified by a Data Network Name, DNN, the UE comprising:
- a registration module, arranged for initiating a registration request for registering the UE in the telecommunication network;
- a receive module, arranged for receiving, from an Access and Mobility Function, AMF, in the telecommunication network a listing of one or more DNNs with which the UE is to establish a PDU session, and
- a PDU establishing module, arranged for establishing at least one PDU session between the UE and at least one DNN of the listing of one or more DNNs.

In a sixth aspect of the present disclosure, there is presented a Policy and Control Function, PCF, or PCF node, arranged for initiating a Packet Data Unit, PDU, session between a registering User Equipment, UE, and a data network identified by a Data Network Name, DNN, the PCF comprising:
- a receive module, arranged for receiving a request, from an Access and Mobility Function, AMF, in the telecommunication network for PDU session establishment information for the UE, and
- a transmit module, arranged for transmitting to the AMF a listing of one or more DNNs for establishing, by the UE, at least one PDU session to at least one DNN of the listing of one or more DNNs.

In a seventh aspect of the present disclosure, a computer program product is provided, comprising a computer readable storage medium, having instructions which, when executed on at least one processor, cause the at least one processor to carry out the method according to a respective one of the first, second and third aspect of the present disclosure.

It will be appreciated that separate computer program products may be provided relating to the Access and Mobility Function, AMF, the User Equipment, UE, and the Policy Control Function, PCF, respectively.

The above-mentioned and other features and advantages of the disclosure will be best understood from the following description referring to the attached drawings. In the drawings, like reference numerals denote identical parts or parts performing an identical or comparable function or operation.

DETAILED DESCRIPTION

Figure 1:
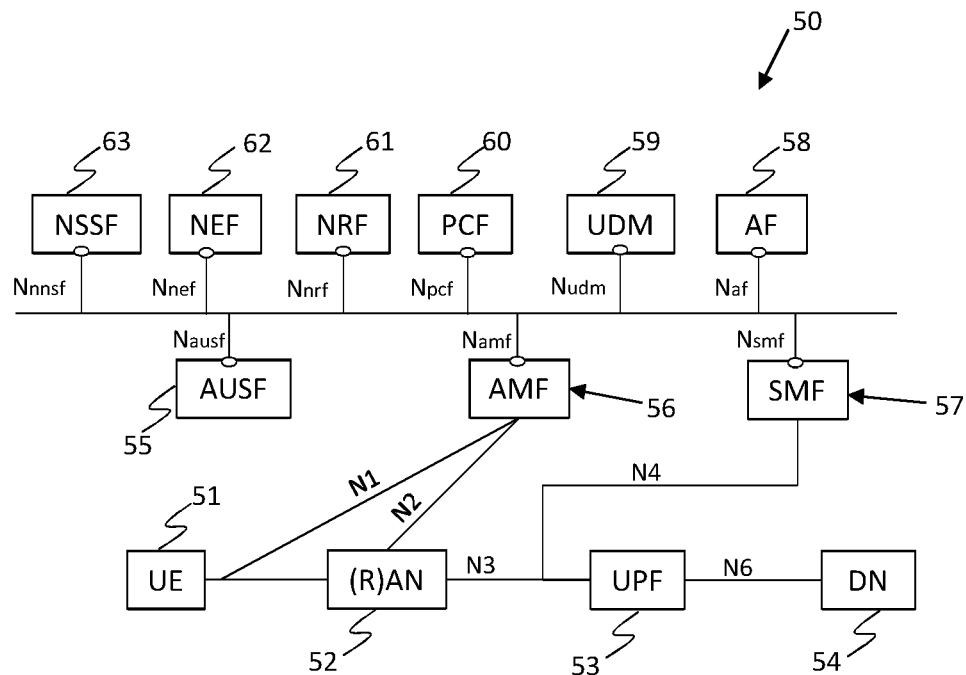
FIG. 1 schematically illustrates part of the architecture of a fifth Generation, 5G, telecommunication network.

In FIG. 1, reference numeral 50 indicates a reference architecture for a 5G system. The 5G System architecture comprises the following selection of network functions, NFs:
- Authentication Server Function, AUSF, 55
- Access and Mobility Management Function, AMF, 56
- Data network, DN, e.g. operator services, Internet access or 3rd party services, 54
- Network Exposure Function, NEF, 62
- NF Repository Function, NRF, 61
- Network Slice Selection Function, NSSF, 63
- Policy Control Function, PCF, 60
- Session Management Function, SMF, 57
- Unified Data Management, UDM, 59
- User Plane Function, UPF, 53
- Application Function, AF, 58
- User Equipment, UE, 51
- (Radio) Access Network, (R)AN, 52.

The functional description of these network functions is specified in clause 6 of the 3GPP standard 23.501, "System Architecture for the 5G system", the contents of which are included herein, by reference. Specifically, in FIG. 1, reference numeral 50 indicates the system architecture for a 5G telecommunication network in a non-roaming case. That is, the UE 51 is in the telecommunication network where it originally belongs to, i.e. is registered. In other words, the UE 51 is in the home telecommunication network.

Figure 2:
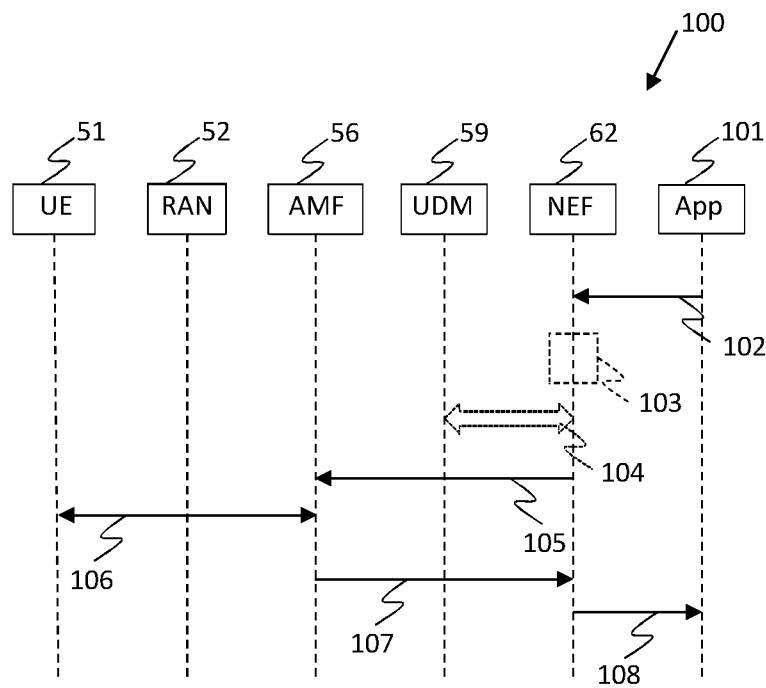
FIG. 2 schematically illustrates the initiation of a Data Network Name, DNN, session in a system according to the prior art.

FIG. 2 is a schematic chart showing the initiation of a Data Network Name, DNN, session in a system according to the prior art. Specifically reference numeral 100 indicates a signalling diagram highlighting the sequence of events and signalling occurring to setup a Packet Data Unit, PDU, session between a UE 51 and a Data Network identified by a DNN. The Application server 101 sends a device trigger request 102 to the Network Exposure Function, NEF, 62. The NEF 62 then proceeds to authenticate 103 the UE 51 and to ensure that the UE 51 is authorized to receive data in the telecommunication network. Once the authentication and authorization 103 has been performed, the NEF 62 retrieves information 104 regarding the subscriber serving NF from the UDM 59. The retrieval often comprises requesting the information to the UDM 59 and receiving the requested information from the UDM 59.

Upon identification of the NF, the NEF 62 sends a device trigger request 105 to the corresponding AMF 56 of the identified NF. When the AMF 56 receives a device trigger request 105, it forwards the request 106 to the corresponding UE 51 and receives a device trigger response 106. The received device trigger response 106 is subsequently forwarded to the UDM 19 and then back to the Application server 101 in instances 107, 108 respectively. From the signalling diagram, it is clear that the initial trigger request is generated by the application server 101 which is in turn generated by a specific application with the UE 51. Furthermore, in a system operating according to signalling diagram 100, the Network does not provide any information regarding which DNN, or APN, the UE 51 should connect to. As a result, the UE 51 establishes connection with a default DNN.

Figure 3:
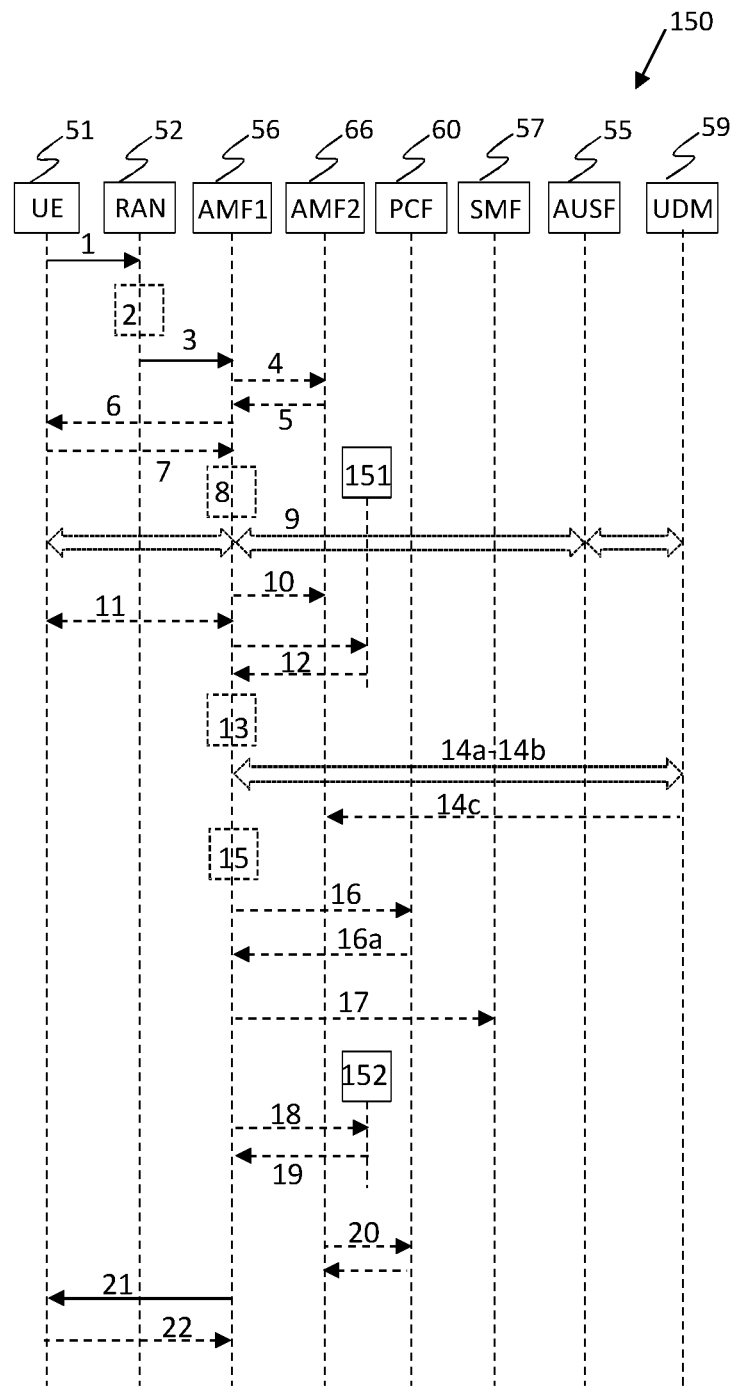
FIG. 3 schematically illustrates the initiation of a DNN session in another system according to prior art.

FIG. 3 schematically illustrates the initiation of a DNN session in another system according to prior art. According to the method 150 illustrated in FIG. 3, the UE 51 sends registration request 1 to the (R)AN 52. Upon receiving the registration request 1, the (R)AN 52 selects an AMF 56 as described in 3GPP TS 23.501, clause 6.3.5.

The (R)AN 52 delivers the registration request 3 to new AMF 56. Optionally, the new AMF 56 requests 4 the UE context to the old AMF 66 if the UE 51 is registered in the other AMF 66. As a response to the optional request 4, the Old AMF 66 responds 5 to the new AMF 56 for the Namf_Communication_UEContextTransfer invocation by including the UE's Subscription Permanent Identifier, SUPI, and Mobility Management, MM, Context. If the SUPI is not provided by the UE 51 nor retrieved from the old AMF 66, the Identity Request procedure 6, 7 is initiated by AMF 56 sending an Identity Request message 6 to the UE 51 to which the UE 51 responds with an Identity Response message 7 including a Subscription Concealed Identifier, SUCI. The SUCI is generated from the SUPI by the UE. To transmit a SUCI instead of a SUPI over a radio interface is proposed as a measure in 5GC in order to ensure privacy.

In a following step, the AMF 56 may decide 8 to initiate UE authentication by invoking an AUSF 55. IF the AMF 56 obtained a SUCI in the previous step, the AMF 56 shall authenticate the UE 51 and will obtain the SUPI as a result of the authentication procedure. The AUSF 55 shall execute authentication 9 of the UE and also simultaneously, the AMF 56 shall initiate NAS security functions. If the AMF has changed, the new AMF 56 notifies 10 the old AMF 66 that the registration of the UE 51 in the new AMF 56 is completed by invoking the Namf_Communication_RegistrationCompleteNotify service operation.

If the PEI was not provided by the UE nor retrieved from the old AMF 66 the Identity Request procedure 11 is initiated by AMF 56, by sending an Identity Request message to the UE to retrieve the PEI. Optionally the new AMF 56 initiates ME identity check 12 by invoking the N5g-eir_MEIdentityCheck_Get service operation. The PEI check is performed as described in clause 4.7 of 3GPPTS 23.501.

If step 14 is to be performed, the new AMF 56, based on the SUPI, selects 13 a UDM 59. The AMF 56 selects a UDM 59 as described in 3GPP TS 23.501, clause 6.3.8. If the AMF 56 has changed since the last registration, or if the UE 51 provides a SUPI which doesn't refer to a valid context in the AMF 56, or if the UE 51 registers to the same AMF it has already registered to a non-3GPP access—i.e. the UE 51 is registered over a non-3GPP access and initiates this registration procedure to add a 3GPP access, the new AMF 56 registers 14a, 14b with the UDM 59 and subscribes to be notified when the UDM 59 deregisters this AMF 56. The AMF 56 retrieves subscription data and subscribes to be notified when subscription data is modified.

When the UDM 59 stores the associated access type together with the serving AMF 56 as indicated in step 14a, it will cause the UDM to initiate 14c a Nudm_UEContext-Management_DeregistrationNotification to the old AMF 66 corresponding to 3GPP access, if one exists. The old AMF 66 removes the MM context of the UE 51.

Conditionally the new AMF 56, based on the SUPI, selects 15 a PCF 60. The AMF 56 sends 16 Npcf_AMPolicyControl_Get service operation to the PCF 60 to retrieve the Access and Mobility policy for the UE 51 and the UE policies.

According to the prior art, the UE 51 is then registered 16 with a PCF 60. The PCF 60 provides 16a the AMF 56 with the necessary policy information. Optionally, the AMF 56 invokes 17 the Namf_EventExposure_Notify if required. The AMF 56 may decide to modify 18 the N2AP UE-TNLA-binding toward N3IWF 152 as described previously. This is done in case AMF is changed and old AMF 66 has an existing N2AP UE-TNLA-bindings toward a N3IWF for the UE. The N3IWF 152 provides a corresponding N2 Response 19 to the new AMF 56.

Optionally the old AMF 66 sends 20 a Npcf_AMPolicyControl_Delete to PCF 60. If the old AMF 66 previously requested UE 51 context to be established in the PCF 60, the old AMF 66 terminates the UE 51 context in the PCF 60 by invoking 20 the Npcf_AMPolicyControl_Delete service operation. The AMF 56 completes the registration procedure 21, 22 towards the UE 51.

Figure 4:
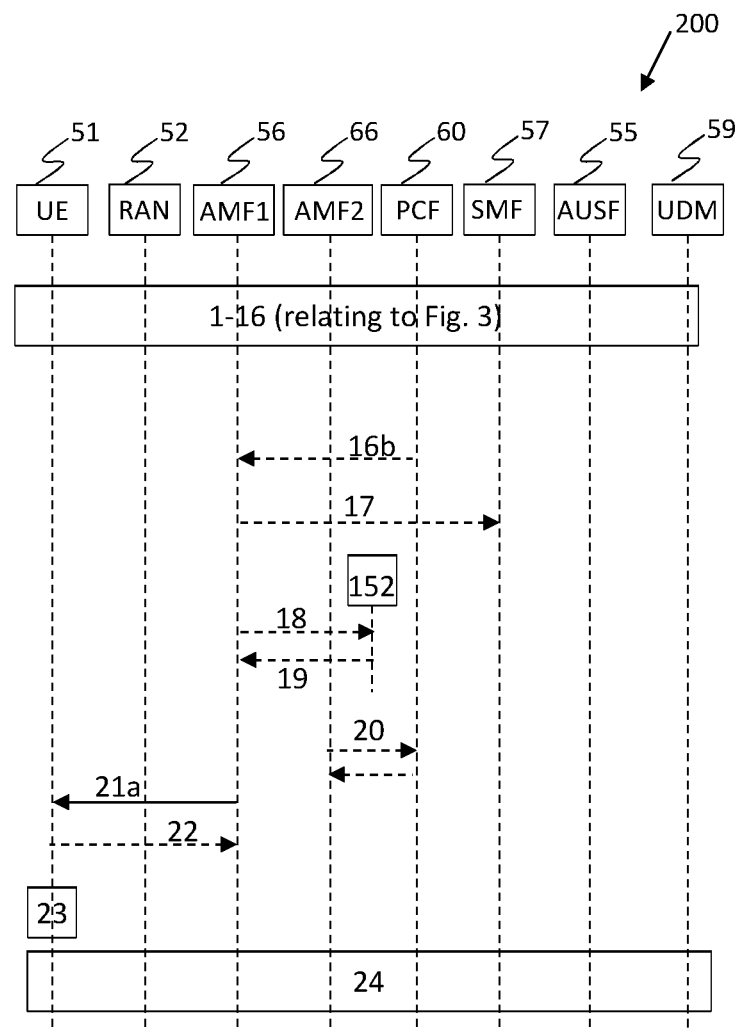
FIG. 4 schematically illustrates an implementation of a method according to the present disclosure.

FIG. 4 schematically illustrates an implementation of a method according to the present disclosure. In FIG. 4, method 200 illustrates an implementation of a method according to the present disclosure wherein steps 1-16 are the same as steps 1-16 as disclosed in relation to FIG. 3 and method 150.

According to the present disclosure, it is proposed that the PCF 60 responds 16b to the Npcf_AMPolicyControl_Get service operation and provides to the AMF 56 the Access and Mobility policy data for the UE 51 and the UE Route Selection Policies, URSP. Within the URSP, the PCF 60 provides the DNN Selection Policy. This policy contains the DNNs the UE 51 shall use for the traffic, and will contain per DNN a new indication if a PDU session to a DNN is to be initiated immediately, i.e. as a first step directly after registration of the UE 51. Then, the PCF 60 requests the UE 51 to initiate immediately, i.e. after and in response to a confirmation of the registration, a PDU session to the DNN. The DNN Selection Policy may contain additional information which is required for the UE to complete the PDU session establishment, e.g. PDU Session Type to use.

The AMF 56 provides 21a to the UE 51, by NAS signalling, the new DNN selection policies with an indication about the PDU sessions that the 5GC expects the UE to establish. The UE 51 checks 23 if the DNN selection policies include the request for the establishment of any PDU session(s). If so, the UE 51 initiates 24 the establishment of the requested PDU sessions using existing procedures including interactions within the 5GC between AMF 56, SMF 57, UDM 59, PCF 60 and UPF 53.

If more than one PDU session is requested to be established, e.g. if the DNN selection policy include indication for more than one DNN, e.g. DNN1 and DNN2, then the UE 51 should first establish the PDU session to DNN1 and then the PDU session to DNN2.

Figure 5:
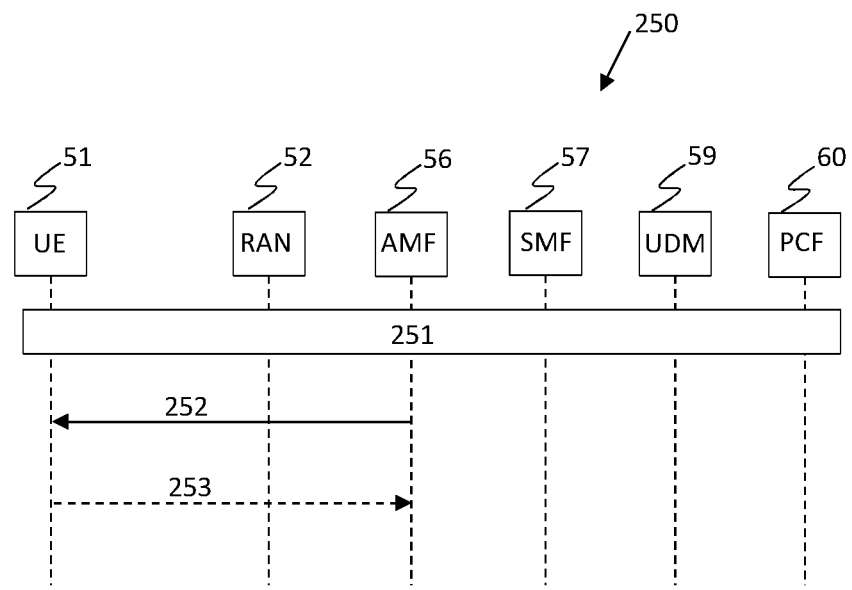
FIG. 5 schematically illustrates an implementation of a method according to the present disclosure.

FIG. 5 schematically illustrates an implementation of a method 250 according to the present disclosure. As stated above, the PCF 60 could at any time update the indications (policies or rules) sent to the UE 51. One way to achieve this is that the PCF 60 subscribes to certain events for example available by the AMF 56 service Namf_EventExposure or subscription updates at the UDR for example using Nudr_User_Data_Management service. Once a certain event has occurred, the PCF 60 could update Npcf_AM-Policycontrol_UpdateNotify operation policies/rules towards the UE 51 via the AMF 56. The AMF 56 can extend the UE 51 Configuration Update procedure as shown in FIG. 5. A separate procedure can be used as well, for example PCF 60 using AMF 56 service operation Namf_Communication_N1N2MessageTransfer.

According to the method 250, the AMF 56 determines 251 the necessity of UE 51 configuration change due to various reasons such as UE mobility change, NW policy, UE subscription change or that the UE 51 needs to perform a Registration Procedure. If a UE 51 is in CM-IDLE, the AMF 56 triggers Network triggered Service Request.

The AMF 56 may include Handover Restriction List in N2 message that delivers UE Configuration Update command to the UE 51 if the service area restriction for the UE 51 is updated. Consequently, the AMF 56 sends 252 UE Configuration Update command containing UE parameters such as 5G-GUTI, TAI List, Allowed NSSAI, NITZ, Mobility Restrictions, LADN Information, Allowed NSSAI, NITZ, UE Configuration Update cause, UE policies/rules to the UE 51.

The AMF 56 includes only one or more of 5G-GUTI, TAI List, Allowed NSSAI, NITZ Network Identity and Time Zone, Mobility Restrictions parameters or LADN Information if the AMF 56 wants to update these NAS parameters without triggering UE re-registration. The AMF 56 includes in the UE Configuration Update Command 252 also a UE Configuration Update cause indicating whether the UE 51 shall acknowledge the command or, in case the command is sent to trigger re-registration, containing Registration Update Request parameter, which indicates the cause for the re-registration and related information on UE behaviour for example, wait for CM-IDLE to perform re-registration. The AMF 56 includes updated UE policies/rules e.g. new DNN selection policies in case the PCF 60 has provided updated UE policies/rules.

If the UE Configuration Update 252 cause requires acknowledgement of the UE Configuration Update Command, then the UE 51 shall send 253 a UE Configuration Update complete message to the AMF 56. The AMF 56 should request acknowledgement for all UE Configuration Updates, except for NITZ. If received, the UE 51 executes the new/updated UE policies/rules.

Figure 6:
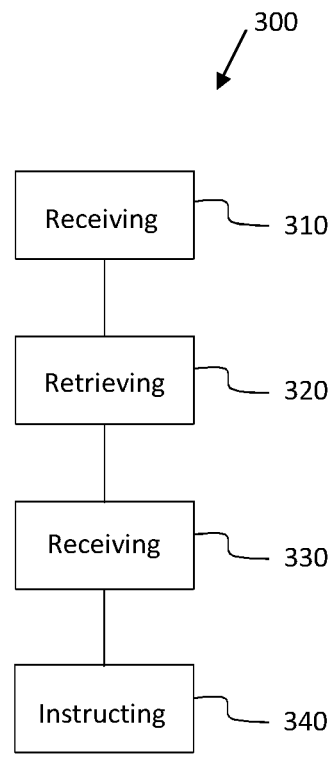
FIG. 6 schematically illustrates basic steps involved in a method according to the present disclosure.

FIG. 6 schematically illustrates the basic steps involved in a method 300 according to the present disclosure. FIG. 6 shows a method 300 of establishing a Packet Data Unit, PDU, session between a registering User Equipment, UE, 51; 600 and a data network identified by a Data Network Name, DNN, in a telecommunication network. The telecommunication network comprises an Access and Mobility Function, AMF, 56; 66; 500 and a Policy Control Function, PCF, 60; 700, and the method 300 comprises the steps of receiving 3; 3 10, by the AMF 56; 66; 500, a registration request initiated by a UE 51; 600 for registering the UE 51; 600 in the telecommunication network.

It further comprises a step of retrieving 16; 320, by the AMF 56; 66; 500, from the PCF 60; 700, PDU session establishment information, wherein the step of retrieving 16; 320 is triggered upon receiving 3; 310 the registration request. In a next step of receiving 16*b*, 330, by the AMF 56; 66; 500, from the PCF 60; 700, PDU session establishment information comprising one or more DNNs to which PDU sessions are to be established by the UE 51; 600. In a further step of transmitting 21*a*; 340, by the AMF 56; 66; 500, to the UE 51; 600 an instruction comprising one or more DNNs for establishing at least one PDU session between the UE 51; 600 and at least one DNN of the one or more DNNs upon receipt of the instruction.

The UE Route Selection Policies, URSP, and the DNN selection policy are defined in the 3GPP TS 23.503 V0.3.0 as follows:

UE Route Selection Policy, URSP: This policy is used by the UE 51 to determine how to route outgoing traffic. Traffic can be routed to an established PDU session, can be offloaded to non-3GPP access outside a PDU session, or can trigger the establishment of a new PDU session. The URSP policy groups of one or more of the following policies:

a) SSC Mode Selection Policy, SSCMSP: This policy is used by the UE 51 to associate UE 51 applications with SSC modes and to determine the PDU session which this traffic should be routed to. It is also used to determine when a new PDU session should be requested with a new SSC mode.

b) Network Slice Selection Policy, NSSP: This policy is used by the UE 51 to associate UE 51 applications with SM-NSSAIs and to determine the PDU session which this traffic should be routed to. It is also used to determine when a new PDU session should be requested with a new SM-NSSAI.

c) DNN Selection Policy: This policy is used by the UE 51 to associate UE 51 traffic with one or more DNNs and to determine the PDU session which this traffic should be routed to. It is also used to determine when a PDU session should be requested to a new DNN. It may also indicate the access type (3GPP or non-3GPP) on which a PDU session to a certain DNN should be requested.

An example of a URSP rule is as follows:

| | |
|---|---|
| Traffic filter: | This (default) URSP rule associates all traffic not matching any prior rule with S-NSSAI-a (first priority), S-NSSAI-b (second priority), SSC Mode 3 and the "internet" DNN. It enforces the following routing policy: All traffic not matching any prior rule should preferably be offloaded directly to any non-3GPP access. If it cannot be directly offloaded to non-3GPP access, it should be transferred on a PDU session supporting S-NSSAI-a, SSC Mode 3 and DNN = internet. Alternatively, it can be transferred on a PDU session supporting S-NSSAI-b, SSC Mode 3 and DNN = internet. The PDU sessions can be established over any Access Type. |
| Direct offload: | |
| Preferred | |
| Slice Info: | |
| S-NSSAI-a, | |
| S-NSSAI-b | |
| Continuity type: Type-3 | |
| DNN: internet | |

This disclosure proposes to enhance the corresponding rule with a new indication for the UE to establish a PDU session as follows:

| | |
|---|---|
| Traffic filter: | This (default) URSP rule associates all traffic not matching any prior rule with S-NSSAI-a (first priority), S-NSSAI-b (second priority), SSC Mode 3 and the "internet" DNN. |
| Direct offload: Preferred | |
| Slice Info: S-NSSAI-a, S-NSSAI-b | |
| | It enforces the following routing policy: |
| Continuity type: Type-3 | All traffic not matching any prior rule should preferably be offloaded directly to any non-3GPP access. |
| DNN: internet | If it cannot be directly offloaded to non-3GPP access, it should be transferred on a PDU session supporting S-NSSAI-a, SSC Mode 3 and DNN = internet. Alternatively, it can be transferred on a PDU session supporting S-NSSAI-b, SSC Mode 3 and DNN = internet. The PDU sessions can be established over any Access Type. |
| PDU session establishment for DNN: Required | |
| | A PDU session has to be established by the UE towards the DNN = internet when the policy is received in the UE. |

Figure 7:
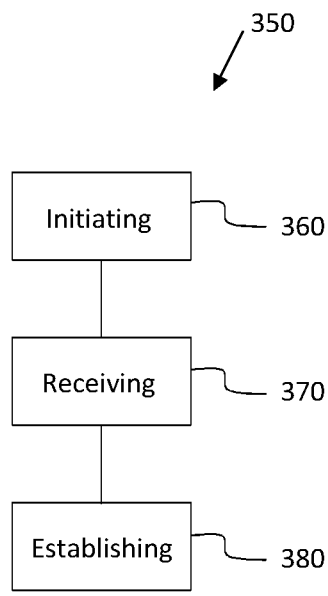
FIG. 7 schematically illustrates basic steps involved in a method according to the present disclosure.

FIG. 7 schematically illustrates the basic steps involved in a method 350 according to the present disclosure. FIG. 7 shows a method 350 of establishing a Packet Data Unit, PDU, session between a registering User Equipment, UE, 51; 600 and a data network identified by a Data Network Name, DNN, in a telecommunication network. The telecommunication network comprising an Access and Mobility Function, AMF, 56; 66; 500 and a Policy Control Function, PCF, 60; 700. The method 350 comprising the steps of initiating 1; 360, by the UE 51; 600, a registration request for registering the UE 51; 600 in the telecommunication network. The method 350 further comprises the step of receiving 21a; 370, by the UE 51; 600 from an AMF 56; 66; 500 of the telecommunication network, in response to the registration request, an instruction comprising one or more DNNs for establishing at least one PDU session between the UE 51; 600 and at least one DNN of the one or more DNNs, and a further step of establishing 24; 380, by the UE 51; 600, at least one PDU session with at least one DNN of the one or more DNNs upon receiving the instruction.

Figure 8:
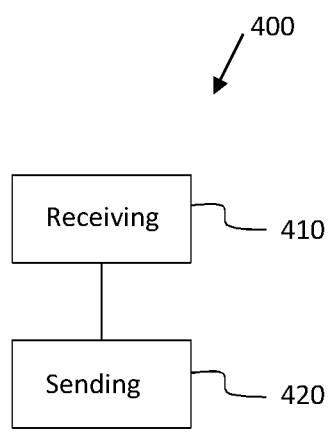
FIG. 8 schematically illustrates basic steps involved in a method according to the present disclosure.

FIG. 8 schematically illustrates the basic steps involved in a method 400 according to the present disclosure. FIG. 8 shows a method 400 of establishing a Packet Data Unit, PDU, session between a registering User Equipment, UE, 51; 600, and a data network identified by a Data Network Name, DNN, in a telecommunication network. The telecommunication network comprising an Access and Mobility Function, AMF, 56; 66; 500 and a Policy Control Function, PCF, 60; 700. The method 400 comprising the steps of receiving 16; 410, by the PCF 60; 700, a request from an AMF 56; 66; 500 for PDU session establishment information for the UE 51; 600, and transmitting 16b; 420, by the PCF 60; 700, to the AMF 56; 66; 500, PDU session establishment information comprising one or more DNNs for establishing at least one PDU session between the UE 51; 600 and at least one DNN of the one or more DNNs.

Figure 9:
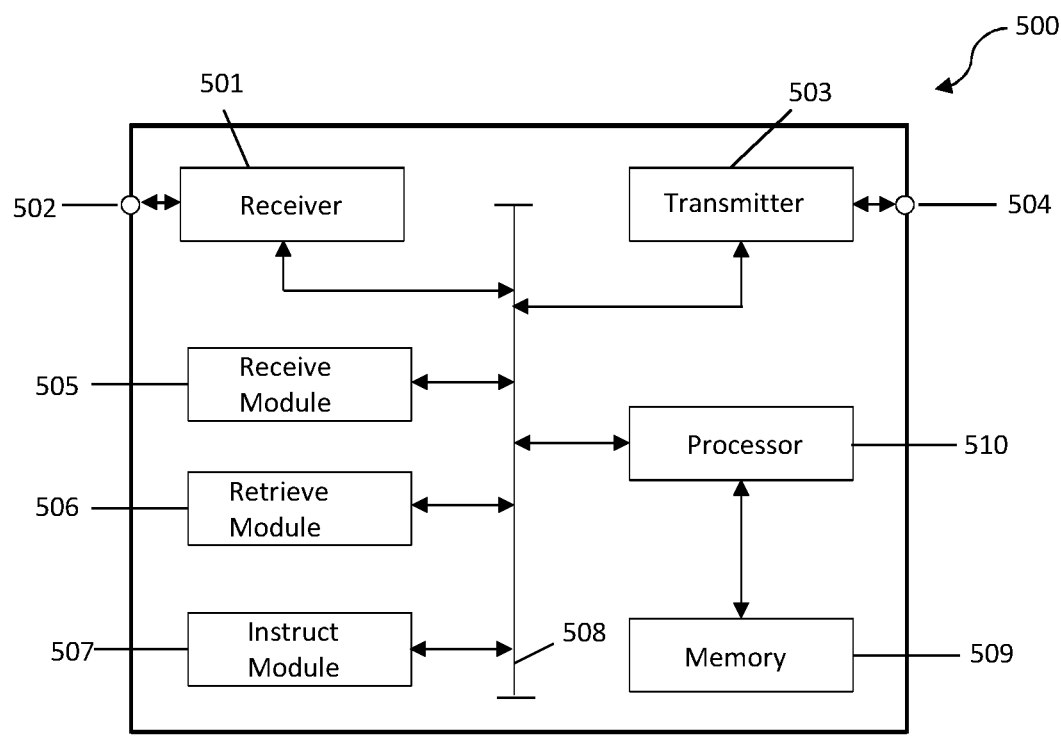
FIG. 9 schematically illustrates an example of a network element.

FIG. 9 schematically illustrates an example of a network element. More specifically, FIG. 9 schematically illustrates an AMF 500 according to the present disclosure. The AMF 500 comprises a receive module 505, arranged for receiving a registration request initiated by a UE 51; 600 for registering the UE 51; 600 in the telecommunication network. It further comprises a retrieve module 506, arranged for retrieving from a Policy Control Function, PCF, 60; 700 in the telecommunication network, PDU Session establishment information, wherein the retrieve module 506 is activated upon receiving the registration request by the receive module 505. The receive module 505 is further arranged to receive from the PCF 60; 700, PDU session establishment information comprising a listing of one or more DNNs to which PDU sessions are to be established by the UE. The AMF 500 also comprises an instruct module 507, arranged for instructing the UE 51; 600 to establish at least one PDU session between the UE 51; 600 and at least one DNN of the listing of one or more DNNs.

In accordance with the present disclosure, the AMF 500 may provide for the following services: termination of Radio Access Network, RAN, Control Plane, CP, interface, termination of Non-Access Stratum, NAS, NAS ciphering and integrity protection, registration management, connection management, reachability management, mobility management, lawful intercept, transport for messages between UE 51; 600 and Session Management Function, SMF, transparent proxy for routing SM messages, access authentication and authorization, transport for Short Message Service, SMS, messages with the UE, Security Anchor function, SEA, Security Context Management, SCM, etc.

The AMF 500 further comprises a Receiver 501, 502 arranged to receive signals from other network elements in the telecommunication network and a transmitter 503, 504 arranged to transmit signals to other network elements in the telecommunication network. The person skilled in the art understands that the receiver 501, 502 and the transmitter 503, 504 may be implemented as a single entity—such as a transceiver—in the network. The AMF 500 also comprises a memory 509 which is arranged to store any intermediate values and/or a computer program product which when executed by the processor 510 causes the AMF 500 to perform a method according to an aspect of the present disclosure. All the internal components of the AMF 500 communicate with one another using an internal bus 508.

Figure 10:
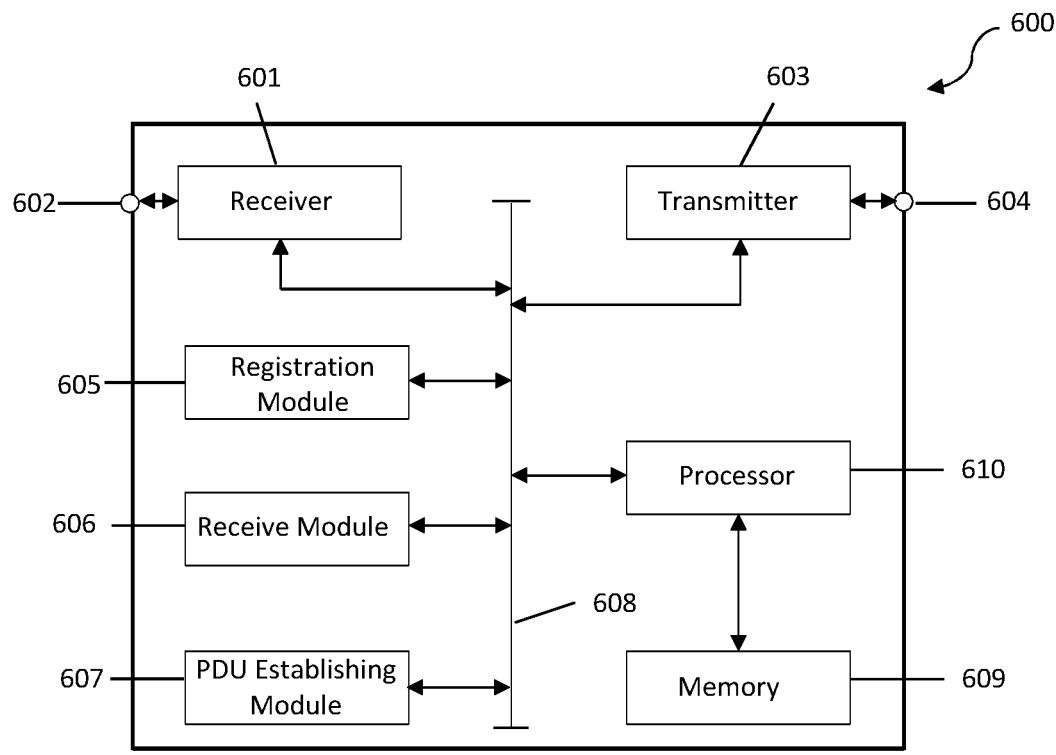
FIG. 10 schematically illustrates an example of a network element.

FIG. 10 schematically illustrates an example of a network element. More specifically, FIG. 10 schematically illustrates a User Equipment 600 according to the present disclosure. The UE 600 comprises a registration module 605, arranged for initiating a registration request for registering the UE 600 in the telecommunication network. The UE 600 further comprises a receive module 606, arranged for receiving, from an Access and Mobility Function, AMF, 56; 66; 500 in the telecommunication network, a listing of one or more DNNs with which the UE 600 is to establish a PDU session. It further comprises a PDU establishing module 607, arranged for establishing at least one PDU session between the UE 600 and at least one DNN of the listing of one or more DNNs.

The UE 600 further comprises a Receiver 601,602 arranged to receive signals from other network elements in the telecommunication network and a transmitter 603, 604 arranged to transmit signals to other network elements in the telecommunication network. The person skilled in the art understands that the receiver 601, 602 and the transmitter 603, 604 may be implemented as a single entity—such as a transceiver—in the network. The UE 600 also comprises a memory 609 which is arranged to store any intermediate values and/or a computer program product which when executed by the processor 610 causes the UE 600 to perform a method according to an aspect of the present disclosure. All the internal components of the UE 600 communicate with one another using an internal bus 608.

Figure 11:
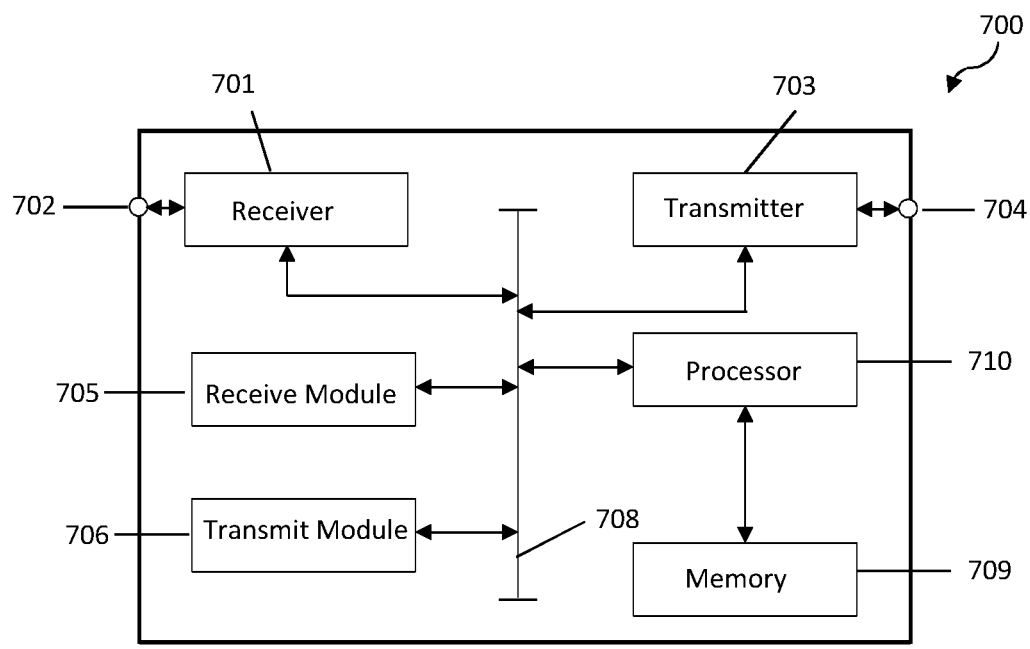
FIG. 11 schematically illustrates an example of a network element.

FIG. 11 schematically illustrates an example of a network element. More specifically, FIG. 11 illustrates a PCF node 700 according to the present disclosure. The PCF 700 comprises a receive module 705, arranged for receiving a request, from an Access and Mobility Function, AMF, 56; 66; 500 in the telecommunication network for PDU session establishment information for the UE 51; 600. It also comprises a transmit module 706, arranged for transmitting to the AMF 56; 66; 500 a listing of one or more DNNs for establishing, by the UE 51; 600, at least one PDU session to at least one DNN of the listing of one or more DNNs.

The PCF 700 further comprises a Receiver 701,702 arranged to receive signals from other network elements in the telecommunication network and a transmitter 703, 704 arranged to transmit signals to other network elements in the telecommunication network. The person skilled in the art understands that the receiver 701, 702 and the transmitter 703, 704 may be implemented as a single entity—such as a transceiver—in the network. The PCF 700 also comprises a memory 709 which is arranged to store any intermediate values and/or a computer program product which when executed by the processor 710 causes the PCF 700 to perform a method according to an aspect of the present disclosure. All the internal components of the PCF 700 communicate with one another using an internal bus 708.

Other variations to the disclosed examples can be understood and effected by those skilled in the art in practicing the claimed disclosure, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid state medium supplied together with or as part of other hardware, but may also be distributed in other forms, such as via the Internet or other wired or wireless telecommunication systems. Any reference signs in the claims should not be construed as limiting scope thereof.

The present disclosure is not limited to the examples as disclosed above, and can be modified and enhanced by those skilled in the art beyond the scope of the present disclosure as disclosed in the appended claims without having to apply inventive skills.

The invention claimed is:

1. A method of establishing a Packet Data Unit (PDU) session between a registering User Equipment (UE) and a data network identified by a Data Network Name (DNN) in a telecommunication network, the telecommunication network comprising an Access and Mobility Function (AMF) and a Policy Control Function (PCF), the method comprising:
  receiving, by the AMF, a registration request initiated by a UE for registering the UE in the telecommunication network;
  retrieving, by the AMF and from the PCF, PDU session establishment information, wherein the retrieving is triggered by the receiving the registration request;
  receiving, by the AMF and from the PCF, PDU session establishment information including UE Route Selection Policies (URSP) data, the USRP data comprising:
    one or more DNNs to which PDU sessions are to be established by the UE;
    a per-DNN indicator for at least one DNN indicating that the UE is required to initiate a PDU session to the at least one DNN immediately after registration; and
    PDU session type information specifying a type of PDU session to be established with a respective DNN of the one or more DNNs; and
  controlling the UE to initiate the PDU session to the at least one DNN immediately after registration, wherein controlling the UE to initiate the PDU session comprises transmitting, by the AMF and to the UE the USRP data received from the PCF.

2. The method of claim 1, wherein the PDU session establishment information received by the AMF from the PCF is comprised in UE policy data.

3. The method of claim 2:
  wherein the UE policy data comprises the UE Route Selection Policies (URSP) data; and
  wherein the one or more DNNs for establishing a PDU session by the UE are comprised in the URSP data.

4. The method of claim 2, wherein the UE policy data comprises the PDU session type information specifying the type of PDU session to be established with the respective DNN of the one or more DNNs.

5. The method of claim 2, further comprising transmitting, to the UE, the UE policy data.

6. A method of establishing a Packet Data Unit (PDU) session between a registering User Equipment (UE) and a data network identified by a Data Network Name (DNN) in a telecommunication network, the telecommunication network comprising an Access and Mobility Function (AMF) and a Policy Control Function (PCF), the method comprising:
  initiating, by the UE, a registration request for registering the UE in the telecommunication network;
  the UE receiving, from the AMF of the telecommunication network and in response to the registration request, Route Selection Policies (URSP) data comprising:
    one or more DNNs to which PDU sessions are to be established by the UE;
    a per-DNN indicator for at least one DNN indicating that the UE is required to initiate a PDU session to the at least one DNN immediately after registration; and
    PDU session type information specifying a type of PDU session to be established with a respective DNN of the one or more DNNs; and
  establishing, by the UE, at least one PDU session with the at least one DNN of the one or more DNNs.

7. The method of claim 6 further comprising:
  receiving, from the AMF, UE policy data; and
  wherein the at least one PDU session is established by the UE in accordance with the UE policy data.

8. The method of claim 6, wherein the UE establishes different PDU sessions each with a different DNN of the one or more DNNs in a sequential manner.

9. A method of establishing a Packet Data Unit (PDU) session between a registering User Equipment (UE) and a data network identified by a Data Network Name (DNN) in a telecommunication network, the telecommunication network comprising an Access and Mobility Function (AMF) and a Policy Control Function (PCF), the method comprising:
  receiving, by the PCF, a request from an AMF for PDU session establishment information for the UE; and
  transmitting, by the PCF and to the AMF, PDU session establishment information including UE Route Selection Policies (URSP) data, the USRP data comprising:
    one or more DNNs to which PDU sessions are to be established by the UE;

a per-DNN indicator for at least one DNN indicating that the UE is required to initiate a PDU session to the at least one DNN immediately after registration; and PDU session type information specifying a type of PDU session to be established with a respective DNN of the one or more DNNs.

10. The method of claim 9, wherein the PCF transmits the PDU session establishment information in UE policy data.

11. The method of claim 10, further comprising:
subscribing, by the PCF, to UE policy data related events available in the network;
updating, by the PCF, UE policy data based on the UE policy data related events; and
transmitting, by the PCF, the PDU session establishment information in the updated UE policy data.

12. The method of claim 11:
wherein the updated UE policy data comprises the UE Route Selection Policy (URSP) data and DNN selection policy data;
wherein the URSP data further comprises:
Session and Service Continuity (SSC) Mode Selection Policy (SSCMSP) data;
Network Slice Selection Policy (NSSP) data;
wherein both SSCMSP data and NSSP data determine an SSC mode and a slice selected for a PDU session to be established by the UE;
the DNN selection policy data arranged for at least one of:
determining a PDU session to be utilized by the UE;
determining when a new PDU session should be established to a new DNN; and
indicating an access type on which a PDU session to a certain DNN is to be requested.

13. An Access and Mobility Function (AMF) arranged for initiating a Packet Data Unit (PDU) session between a registering User Equipment (UE) and a data network identified by a Data Network Name (DNN) in a telecommunication network, the AMF comprising:
processing circuitry; and
memory comprising instructions executable by the processing circuitry whereby the AMF is operative to:
receive a registration request initiated by the UE for registering the UE in the telecommunication network;
retrieve, from a Policy Control Function (PCF) in the telecommunication network, PDU Session establishment information, wherein the retrieving is in response to receiving the registration request,
receive, from the PCF, PDU session establishment information including UE Route Selection Policies (URSP) data, the USRP data comprising:
a listing of one or more DNNs to which PDU sessions are to be established by the UE;
a per-DNN indicator for at least one DNN indicating that the UE is required to initiate a PDU session to the at least one DNN immediately after registration; and
PDU session type information specifying a type of PDU session to be established with a respective DNN of the one or more DNNs; and
control the UE to initiate the PDU session to the at least one DNN immediately after registration, wherein to control the UE to initiate the PDU session, the AMF is further operative to transmit the USRP data received from the PCF to the UE.

14. A User Equipment (UE) arranged for establishing a Packet Data Unit (PDU) session in a telecommunication network between the UE and a data network identified by a Data Network Name (DNN), the UE comprising:
processing circuitry;
memory containing instructions executable by the processing circuitry whereby the UE is operative to:
initiate a registration request for registering the UE in the telecommunication network;
receive, from an Access and Mobility Function (AMF) in the telecommunication network, UE Route Selection Policies (URSP) data comprising:
a listing of one or more DNNs with which the UE is to establish a PDU session;
a per-DNN indicator for at least one DNN indicating that the UE is required to initiate a PDU session to the at least one DNN immediately after registration; and
PDU session type information specifying a type of PDU session to be established with a respective DNN of the one or more DNNs; and
establish at least one PDU session between the UE and at least one DNN of the listing of one or more DNNs.

15. A Policy and Control Function (PCF), arranged for initiating a Packet Data Unit (PDU) session between a registering User Equipment (UE) and a data network identified by a Data Network Name (DNN), the PCF comprising:
processing circuitry;
memory containing instructions executable by the processing circuitry whereby the PCF is operative to:
receive a request, from an Access and Mobility Function (AMF) in the telecommunication network, for PDU session establishment information for the UE; and
transmit, to the AMF, PDU session establishment information including UE Route Selection Policies (URSP) data, the USRP data comprising:
one or more DNNs to which PDU sessions are to be established by the UE;
a per-DNN indicator for at least one DNN indicating that the UE is required to initiate a PDU session to the at least one DNN immediately after registration; and
PDU session type information specifying a type of PDU session to be established with a respective DNN of the one or more DNNs.

16. A non-transitory computer readable recording medium storing a computer program product for establishing a Packet Data Unit (PDU) session between a registering User Equipment (UE) and a data network identified by a Data Network Name (DNN) in a telecommunication network, the telecommunication network comprising an Access and Mobility Function (AMF) and a Policy Control Function (PCF), the computer program product comprising software instructions which, when run on processing circuitry of the AMF, causes the AMF to:
receive a registration request initiated by a UE for registering the UE in the telecommunication network;
retrieve, from the PCF, PDU session establishment information, wherein the retrieving is triggered by the receiving the registration request;
receive, from the PCF, PDU session establishment information including UE Route Selection Policies (URSP) data, the USRP data comprising:
one or more DNNs to which PDU sessions are to be established by the UE;

a per-DNN indicator for at least one DNN indicating that the UE is required to initiate a PDU session to the at least one DNN immediately after registration; and PDU session type information specifying a type of PDU session to be established with a respective DNN of the one or more DNNs; and control the UE to initiate the PDU session to the at least one DNN immediately after registration, wherein to control the UE to initiate the PDU session, the software instructions executing on the processing circuitry causes the AMF to transmit, to the UE, the USRP data received from the PCF.

17. A non-transitory computer readable recording medium storing a computer program product for establishing a Packet Data Unit (PDU) session between a registering User Equipment (UE) and a data network identified by a Data Network Name (DNN) in a telecommunication network, the telecommunication network comprising an Access and Mobility Function (AMF) and a Policy Control Function (PCF), the computer program product comprising software instructions which, when run on processing circuitry of the UE, causes the UE to:

initiate a registration request for registering the UE in the telecommunication network;

receive, from the AMF and in response to the registration request, UE Route Selection Policies (URSP) data comprising:

a listing of one or more DNNs with which the UE is to establish a PDU session;

a per-DNN indicator for at least one DNN indicating that the UE is required to initiate a PDU session to the at least one DNN immediately after registration; and PDU session type information specifying a type of PDU session to be established with a respective DNN of the one or more DNNs; and establish at least one PDU session with at least one DNN of the one or more DNNs.

18. A non-transitory computer readable recording medium storing a computer program product for establishing a Packet Data Unit (PDU) session between a registering User Equipment (UE) and a data network identified by a Data Network Name (DNN) in a telecommunication network, the telecommunication network comprising an Access and Mobility Function (AMF) and a Policy Control Function (PCF), the computer program product comprising software instructions which, when run on processing circuitry of the PCF, causes the PCF to:

receive a request from an AMF for PDU session establishment information for the UE; and transmit, to the AMF, PDU session establishment information including UE Route Selection Policies (URSP) data, the USRP data comprising:

one or more DNNs to which PDU sessions are to be established by the UE;

a per-DNN indicator for at least one DNN indicating that the UE is required to initiate a PDU session to the at least one DNN immediately after registration; and PDU session type information specifying a type of PDU session to be established with a respective DNN of the one or more DNNs.

* * * * *